United States Patent
Ozden et al.

(10) Patent No.: US 12,209,218 B2
(45) Date of Patent: Jan. 28, 2025

(54) REDUCED-POLYMER-LOADING, HIGH-TEMPERATURE FRACTURING FLUIDS AND METHODS AND SYSTEMS RELATED THERETO

(71) Applicant: SAUDI ARABIAN OIL COMPANY, Dhahran (SA)

(72) Inventors: Sehmus Ozden, Katy, TX (US); Feng Liang, Houston, TX (US); Rajesh Saini, Cypress, TX (US); Hung Q. Truong, Cypress, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/339,922

(22) Filed: Jun. 22, 2023

(65) Prior Publication Data

US 2024/0425748 A1 Dec. 26, 2024

(51) Int. Cl.
*C09K 8/68* (2006.01)
*C09K 8/60* (2006.01)
*C09K 8/66* (2006.01)

(52) U.S. Cl.
CPC .............. *C09K 8/68* (2013.01); *C09K 8/602* (2013.01); *C09K 8/665* (2013.01)

(58) Field of Classification Search
CPC .......... C09K 8/60; C09K 8/602; C09K 8/608; C09K 8/62; C09K 8/66; C09K 8/68; C09K 8/665; C09K 8/70; C09K 8/84; C09K 8/86; C09K 8/88; C09K 8/92; E21B 43/25; E21B 43/26
See application file for complete search history.

(56) References Cited

U.S. PATENT DOCUMENTS

| | | | |
|---|---|---|---|
| 3,938,594 A | 2/1976 | Rhudy et al. | |
| 4,137,182 A | 1/1979 | Golinkin | |
| 5,007,481 A | 4/1991 | Williams et al. | |
| 5,278,203 A * | 1/1994 | Harms | C09K 8/64 523/205 |
| 8,309,498 B2 | 11/2012 | Funkhouser et al. | |
| 8,450,252 B2 | 5/2013 | Funkhouser et al. | |
| 10,793,768 B2 | 10/2020 | Patel et al. | |
| 2008/0318812 A1 | 12/2008 | Kakadjian et al. | |

(Continued)

FOREIGN PATENT DOCUMENTS

| | | | |
|---|---|---|---|
| CA | 3 105 366 A1 | 7/2021 | |
| CN | 103 497 745 A | 1/2014 | |
| CN | 104004503 A * | 8/2014 | C01B 33/44 |

OTHER PUBLICATIONS

Safety-Kleen, Safety Data Sheet, Safety-Kleen Virgin 105 Solvent, Jul. 2018, pp. 1-10 (Year: 2018).*

(Continued)

*Primary Examiner* — Angela M DiTrani Leff
(74) *Attorney, Agent, or Firm* — Vorys, Sater, Seymour and Pease LLP (57) ABSTRACT

Methods and systems including a composition of a hydratable polymer slurry comprising a hydrocarbon-based solvent. The hydrocarbon-based solvent includes a hydratable polymer powder and at least one of a polar surfactant, a hydrocarbon-soluble polymer, and/or an organophilic clay, wherein the polymer slurry is prepared at a temperature greater than 22° C. by mixing.

14 Claims, 4 Drawing Sheets

(56) References Cited

U.S. PATENT DOCUMENTS

| | | | |
|---|---|---|---|
| 2012/0006551 A1 | 1/2012 | Carman et al. | |
| 2012/0035085 A1* | 2/2012 | Parnell | C09K 8/588 |
| | | | 507/213 |
| 2013/0118740 A1 | 5/2013 | Sherman et al. | |
| 2016/0122626 A1* | 5/2016 | Dwarakanath | C09K 8/584 |
| | | | 166/305.1 |
| 2017/0313930 A1* | 11/2017 | Patel | C09K 8/68 |
| 2018/0155615 A1* | 6/2018 | Rahy | C09K 8/882 |
| 2021/0130679 A1 | 5/2021 | Patel et al. | |
| 2021/0155847 A1 | 5/2021 | Price | |
| 2021/0324259 A1 | 10/2021 | Diley | |
| 2022/0002610 A1* | 1/2022 | Melbouci | C09K 8/602 |

OTHER PUBLICATIONS

Google patents translation of CN 104004503A (Year: 2014).*

E. C. Jennifer and O. P. Ifedi. Modification of natural bentonite clay using cetyl trimetyl-ammonium bromide and its adsorption capability of some petrochemical wastes. Chemistry International 5(4) (2019) 269-273. (Year: 2019).*

Gupta, D. V., and Paul Carman. "Fracturing Fluid for Extreme Temperature Conditions is Just as Easy as the Rest." Paper presented at the SPE Hydraulic Fracturing Technology Conference, The Woodlands, Texas, USA, Jan. 2011.

Gaillard, N.., Thomas, A.., and C.. Favero. "Novel Associative Acrylamide-based Polymers for Proppant Transport in Hydraulic Fracturing Fluids." Paper presented at the SPE International Symposium on Oilfield Chemistry, The Woodlands, Texas, USA, Apr. 2013.

Funkhouser, Gary P., and Lewis R. Norman. "Synthetic Polymer Fracturing Fluid for High-Temperature Applications." Paper presented at the International Symposium on Oilfield Chemistry, Houston, Texas, Feb. 2003.

ISR-WO dated Sep. 26, 2024 for PCT/US2024/034600, which claims priority to the present application.

* cited by examiner

Day 1         Day 6

FIG. 3

Day 0         Day 1

FIG. 4

Day 1  Day 20

FIG. 5

Day 0  Day 20

FIG. 6

Day 1    Day 20

FIG. 7

REDUCED-POLYMER-LOADING, HIGH-TEMPERATURE FRACTURING FLUIDS AND METHODS AND SYSTEMS RELATED THERETO

FIELD OF THE DISCLOSURE

The present disclosure relates generally to oilfield production and, more particularly, to reduced-polymer-loading, high-temperature fracturing fluid compositions, systems, and methods related thereto.

BACKGROUND OF THE DISCLOSURE

Hydraulic fracturing is the process used to increase the rate of production of hydrocarbons from low-permeability reservoirs and damaged reservoirs. Typically, in a fracturing process a fracturing fluid is pumped into a wellbore at high pressures to break down the rock formation and carry proppant particulates inside the generated fractures. The deposited proppant in the fracture creates highly conductive paths to produce oil or gas at enhanced rates.

There are several parameters, such as component availability, cost, environmental impact, and effectiveness in a particular subterranean formation to formulate an appropriate hydraulic fracturing fluid. Hydraulic fracturing fluids vary from simple blends of chemical additives to complex formulations, and hydraulic fracturing operations require tools and equipment to accommodate dry additives (e.g., dry polymer powders to achieve needed viscosity). For example, dry powders can precipitate and phase separate in a hydrocarbon-based slurry, such as during storage or transportation in tanks and settle to the bottom thereof and compact, requiring re-blending before use. The precipitation and phase separation in hydrocarbon-based slurries is particularly prevalent at high temperatures (100-150° F.).

Oil-based slurries or suspensions are an alternative to replace dry powder. The oil-based slurries are manufactured in a plant setting using a reactor. Generally dry polymer or other solid additives are mixed with a suspending aid in oil to form a stable dispersion. However, oil-based slurries face some challenges during transportation and storage in field applications. One of the challenges is the precipitation of solid additives during transportation and prolonged storage. This problem requires re-blending of formulations before use and it is difficult to do in a large tank or totes containing these slurries. The problem becomes even more acute when the precipitated polymer compaction happens at the bottom of a storage vessel, making it harder to re-disperse it in oil medium by mechanical means. The precipitation and phase separation of the additives in oil slurries is a challenge when the temperature is high (100-150° F.).

Finally, water-based suspensions offer an alternative to the problems associated with dry powder and oil-based slurries or emulsions, but are much less efficient. It requires a much larger volume of a water-based suspension to deliver the same effective amount of proppant as a powder or an oil-emulsion. The large volumes of water-based suspensions needed presents undesirable obstacles for transportation, storage, and on-the-fly fracturing operations.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a polymer slurry is provided including a hydrocarbon-based solvent. The hydrogen-based solvent includes a polymer powder and at least one of a polar surfactant, a hydrocarbon-soluble polymer, or an organophilic clay, wherein the polymer slurry is prepared at a temperature greater than 22° C. by mixing.

According to an embodiment consistent with the present disclosure, a reduced-polymer-loading, high-temperature fracturing fluid is provided. The reduced-polymer-loading, high-temperature fracturing fluid includes a polymer slurry and an aqueous fluid. The polymer slurry includes a hydrocarbon-based solvent having a polymer powder and at least one of a polar surfactant, a hydrocarbon-soluble polymer, and/or an organophilic clay, wherein the polymer slurry is prepared at a temperature greater than 22° C. by mixing.

According to an embodiment consistent with the present disclosure, a method of treating a subterranean formation. A polymer slurry is prepared including a hydrocarbon-based solvent. The hydrocarbon-based solvent includes a polymer powder and at least one of a polar surfactant, a hydrocarbon-soluble polymer, and/or an organophilic clay, wherein the polymer slurry is prepared at a temperature greater than 22° C. by mixing. The polymer slurry is hydrated with an aqueous carrier fluid to form a reduced-polymer-loading, high-temperature fracturing fluid. The reduced-polymer-loading, high-temperature fracturing fluid is introduced into a subterranean formation at a rate and pressure to induce at least one fracture therein.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Embodiments of the present disclosure will now be described in detail with reference to the accompanying Figures. Like elements in the various Figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

The present disclosure relates generally to oilfield production and, more particularly, to reduced-polymer-loading, high-temperature fracturing fluid compositions and systems and methods related thereto.

A reduced-polymer-loading, high-temperature fracturing fluid is disclosed herein comprising a polymer slurry of a hydrocarbon-based (hydrophobic) solvent and a polymer powder (i.e., the polymer powder is suspended in the hydrocarbon-based solvent), wherein the polymer slurry is (1) stable for extended periods of time at temperatures of 80° F. to 150° F. for storage and transportation; (2) does not phase separate (e.g., does not settle to the bottom of holding tanks); (3) hydrates within one (1) minute of contacting an aqueous carrier fluid; (4) has low viscosity for case of pumping and metering to formulate the reduced-polymer-loading, high-temperature fracturing fluid described herein (e.g., on-the-fly); (5) incorporates suspension aids that do not adversely affect formation permeability; (6) does not exhibit reactivity or degradation of the polymer over time; and (7) comprises at least one additive to reduce transport cost compared to traditional emulsion-based systems having a polymer content of less than 30%; transport costs are reduced because certain additive(s) need not be stored or transported separate from the reduced-polymer-loading, high-temperature fracturing fluid.

More particularly, the reduced-polymer-loading, high-temperature fracturing fluid disclosed herein comprises a polymer slurry of a hydrocarbon-based (hydrophobic) solvent, a water-soluble polymer powder, a suspension aid, and a surfactant at high temperature (34° C.-65° C.), followed by hydration in an aqueous carrier fluid comprising at least one additive as discussed hereinbelow.

Reduced-Polymer-Loading, High-Temperature Fracturing Fluids ("Fracturing Fluid")

As provided above, the fracturing fluid includes a polymer slurry and an aqueous carrier fluid.

The polymer slurry is prepared in a hydrocarbon-based oil. The hydrocarbon-based oil may include, but is not limited to, hydrotreated petroleum distillate, hydrotreated heavy naphthalenic oil, mineral oil, diesel oil, castor oil, palm oil and derivatives, vegetable oil, animal oils, polyols-based hydrocarbons, biodegradable fatty acids, acetals, olefins, and the like (e.g., other hydrocarbon bases), and any combination thereof.

The concentration of the hydrocarbon-based oil in the polymer slurry may be in the range of about 20 weight % (wt. %) to about 80 wt. % of the polymer slurry, such as about 20 wt. % to about 60 wt. %, or about 30 wt. % to about 50 wt. %, or about 40 wt. % to about 80 wt. %, encompassing any value and subset therebetween.

The hydrocarbon-based oil is mixed with a polymer powder and one or more additives.

The polymer powder may include, but is not limited to, polyacrylamide, partially hydrolyzed polyacrylamide, a copolymer of acrylamide and 2-acrylamido-2-methylpropanesulfonic acid (AMPSA), a terpolymer of acrylamide, acrylic acid and 2-acrylamido-2-methylpropanesulfonic acid (AMPSA), or other acrylamide-based polymers with hydrophobic monomers, and any combination thereof. Alone or in combination with the acrylamide polymer aforementioned, the polymer powder may include, but is not limited to, a cross-linked polymer (CLP) which contains carboxylic acid groups such as carboxymethyl cellulose (CMC), carboxymethyl guar (CMG), carboxymethyl hydroxypropyl guar (CMHPG), partially hydrolyzed polyacrylamide (PHPA), a terpolymer of acrylamide, acrylic acid and 2-acrylamido-2-methylpropanesulfonic acid (AMPSA), or any other acrylamide-based polymer which contains acrylic acid monomer or their salts, and any combination thereof.

In one or more aspects, the polymer powder, excluding additives, may be included in the polymer slurry in an amount in the range of about 20 wt. % to about 55 wt. % of the polymer slurry, such as about 25 wt. % to about 50 wt. %, or about 30 wt. % to about 45 wt. %, or about 40 wt. % to about 55 wt. %, encompassing any value and subset therebetween.

One or more additives are included in the polymer powder slurry. Additives may include, but are not limited to, cross-linkers, friction reducers, suspending agents, surfactants (e.g., non-ionic, anionic, cationic, amphoteric surfactants,), clays, clay activators, clay stabilizers, gel stabilizers at the temperature between 22° C. to 60° C., which improves the interactions synergistically between hydrocarbon-based solvent and polymer structures, proppant, friction reducers, and other additives, and any combination thereof. In particular, the polymer powder slurry of the present disclosure may comprise a hydrocarbon-based oil (e.g., LPA® 210 (Ecolink, India)), a polymer powder (e.g., DP/JBA 5088 (SNF, Georgia)), a polymer hydration activator (e.g., an ethoxylate), a hydrocarbon-soluble polymer suspending agent (e.g., KRATON™ G1701E (Kraton Corporation, TX)), a clay activator (e.g., MeOH (95%)+$H_2O$ (5%)), and a suspending agent (e.g., OSC-100).

In one or more embodiments, the polymer powder slurry may be crosslinkable using a crosslinker. The crosslinker may include, but is not limited to, metal-based crosslinker such as zirconium, titanium, or chromium, and any combination thereof. The amount of crosslinker may depend on a number of factors, including the selected one or more polymer powders, but generally is in the range of about 0.02 wt. % to about 2 wt. % of the polymer powder, such as about 0.05 wt. % to about 0.5 wt. %, or about 0.5 wt. % to about 1 wt. %, or about 1 wt. % to about 2 wt. % of the polymer powder, encompassing any value and subset therebetween.

In one or more instances, the selected crosslinker may be used with a friction reducing polymer (FRP), where the crosslinker does not include carboxylic acid or carboxylate groups, such as a polyacrylamide or a copolymer of acrylamide and 2-acrylamido-2-methylpropanesulfonic acid (AMPSA), or other acrylamide-based polymer with hydrophobic monomers, but without carboxylic acid or carboxylate group. In addition, the choice of the crosslinker also influences the choice of the friction reducing polymer. For example, a metal ion crosslinker, such as a titanium or zirconium based crosslinker, would also eliminate the use of a friction reducing polymer that includes hydroxyl groups. Examples of friction reducing polymers include, but are not limited to, a copolymer of acrylamide and 2-acrylamido-2-methyl-1-propane sulfonic acid (e.g., FLOJET® DRP 1300, SNF. Georgia), polyacrylamide, and the like, and any combination thereof.

When included, the crosslinked polymer powder may be included in the polymer slurry in an amount in the range of about 5 wt. % to about 60 wt. % of the polymer slurry, such as about 10 wt. % to about 60 wt. %, or about 20 wt. % to about 60 wt. %, or about 30 wt. % to about 50 wt. %, or about 20 wt. % to about 40 wt. %, or about 20 wt. % to about 30 wt. %, encompassing any value and subset therebetween.

The pH adjusting agent may be required because crosslinking can be optimized at a preferred pH range. A pH adjusting agent in this case can include an acetic acid solution, an acetic acid/acetate buffer solution, or hydrochloric acid. The type and amount of pH adjusting agent will depend on the selected polymer powder, crosslinker, and the like.

Clay, particularly organophilic clays, may be included in the polymer slurry to act as a suspension aid. Examples of suitable suspension aids include, but are not limited to, organophilic clays clay treated with long chain hydrophobic amines including but not limited with quaternary ammonium compounds, dimethyl dialkyl ammonium compounds, trimethyl monoalkyl ammonium compounds. For example, the following clays can be used: cetylammonium, cetyltrimethylammonium Bromide, Hexadecyltrimethylammonium bromide, Octadecylammonium bromide, Tetradecyl trimethylammonium bromide, Hexadecyl trimethylammonium bromide, 1-Hexadecylamin, Octadecylamine, Trimethylammonium bromide, Octadecylammonium bromide, (Butoxymethyl) dodecyl dimethylammonium chloride, Dodecyl dimethyl(hexyloxymethyl)-ammonium Chloride, Dodecyl dimethyl(octyloxymethyl)-ammonium chloride, (Decyloxymethyl)dodecyl dimethylammonium chloride, Dodecyl dimethyl-(dodecyloxymethyl) ammonium Chloride, (Benzyloxymethyl) dodecyl dimethylammonium chloride, Octadecylammonium chloride, Bis(2-hydroxyethyl) laurylammonium chloride, Diethyl[2(methacryloyloxyl) ethyl]-ammonium chloride, Bis(2hydroxyethyl)lauryl-(vinylbenzyl)ammonium chloride, Tetrabutyl phosphonium bromide, Tributyl hexadecylphosphonium bromide, Tributyl tetradecylphosphonium chloride, Tetraphenyl phosphonium bromide, Methyl triphenylphosphonium bromide, Ethyl triphenylphosphonium bromide, Propyl triphenylphosphonium bromide, Trimethyloctadecylammonium, Dimethyldioctadecylammonium, Trimethyloctadecylammonium, Dimethyldioctadecylammonium, Dimethyldi(HT)ammonium, and any combination thereof.

The clay may be included in the polymer slurry in an amount in the range of about 0.1 wt. % to about 5 wt. % of the polymer slurry, such as about 0.1 wt. % to about 4.5 wt. %, or about 0.5 wt. % to about 4 wt. %, or about 1 wt. % to about 3.5 wt. %, or about 1.5 wt. % to about 3 wt. %, encompassing any value and subset therebetween.

Hydrocarbon soluble polymers can also be used, alone or in combination with an organophilic clay, as a suspending aid. Examples of such hydrocarbon-soluble polymers include, but are not limited to, KRATON™ G1701E (Kraton Corporation, TX), which is linear diblock copolymer based on styrene and ethylene/propylene, sulfonated polystyrene, sulfonated t-butyl styrene, sulfonated polyethylene, sulfonated polypropylene, sulfonated styrene/acrylonitrile copolymers, sulfonates styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated polyisoprene, and sulfonated elastomers and their copolymers such as isoprene styrene sulfonate copolymer polymer, styrene, t-butyl styrene, acrylonitrile, isoprene, butadiene, acrylates, methacrylates, vinyl acetate, and any combination thereof.

The hydrocarbon soluble polymers may be included in the polymer slurry in an amount in the range of about 0.1 wt. % to about 20 wt. % of the polymer slurry, such as about 0.1 wt. % to about 5 wt. %, or about 5 wt. % to about 15 wt. %, or about 1 wt. % to about 10 wt. %, or about 10 wt. % to about 20 wt. %, encompassing any value and subset therebetween.

In one or more aspects, the polymer slurry may additionally include a clay activator, such as an aprotic polar solvent having a higher permittivity than alcohols to swell and/or disperse the suspended clay. Examples of clay activators include, but are not limited to, N,N-dimethylformamide, N,N-dimethylacetamide, ethylene carbonate, propylene carbonate or dimethyl sulfoxide, and the like, and any combination thereof.

A clay activator may be included in the polymer slurry in an amount in the range of about 0.05 wt. % to about 1 wt. % of the organophilic clay, such as about 0.1 wt. % to about 0.9 wt. %, or about 0.4 wt. % to about 0.8 wt. %, or about 0.5 wt. % to about 1 wt. %, or about 0.05 wt. % to about 0.5 wt. %, encompassing any value and subset therebetween.

The aqueous carrier fluid may include, but is not limited to, freshwater, acidified water, salt water, seawater, brine (e.g., a saturated salt solution), or an aqueous salt solution (e.g., a non-saturated salt solution), purified wastewater, and any combination thereof. In one or more instances, the aqueous carrier fluid is "slick water," having a low viscosity of generally less than about 100 centipoise (cP), such as in the range of about 1 cP to about 100 cP, or from a lower limit of 1 cP, 10 cP, 20 cP, 30 cP, 40 cP, and 50 cP to an upper limit of 100 cP, 90 cP, 80 cP, 70 cP, 60 cP, and 50 cP, encompassing any value and subset therebetween.

In some embodiments, the aqueous carrier fluid may comprise proppant particulates for creating proppant packs in produced fractures during hydraulic fracturing operations with the finalized reduced-polymer-loading, high-temperature fracturing fluid of the present disclosure. Alternatively, the proppant may be included after the polymer slurry has been hydrated with the aqueous carrier fluid. Suitable materials for these proppant particulates may include, but are not limited to, sand, bauxite, gravel, ceramic material, glass material, polymeric material (e.g., ethylene-vinyl acetate or composite materials), polytetrafluoroethylene material, nut shell pieces, a cured resinous particulate comprising nut shell pieces, seed shell pieces, a cured resinous particulate comprising seed shell pieces, fruit pit pieces, a cured resinous particulate comprising fruit pit pieces, wood, composite particulates, and any combination thereof. Suitable composite particulates may comprise a binder and a filler material, wherein suitable filler materials may include, but are not limited to, silica, alumina, fumed carbon, carbon black, graphite, mica, titanium dioxide, barite, meta-silicate, calcium silicate, kaolin, talc, zirconia, boron, fly ash, hollow glass microspheres, solid glass, and the like, and any combination thereof.

In one or more embodiments, when included, the proppant particulates may be present in the final reduced-polymer-loading, high-temperature fracturing fluid in an amount in the range of about 0.25 pounds per gallon (ppg) to about 30 ppg by volume of the carrier fluid, such as from a lower limit of about 0.25 ppg, 0.5 ppg, 1 ppg, 5 ppg, 10 ppg, and 15 ppg to an upper limit of about 30 ppg, 25 ppg, 20 ppg, and 15 ppg, encompassing any value and subset therebetween.

The aqueous carrier fluid may further include additional additives including, but not limited to, a crosslinking agent (e.g., any of those listed above, and can be in lieu of inclusion in the polymer slurry), a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a particulate, a proppant, a gravel particulate, a lost circulation material, a foaming agent, a gas, a pH control additive, a breaker, a biocide, a bactericide, a crosslinker, a stabilizer, a chelating agent, a scale inhibitor, a gas hydrate inhibitor, an oxidizer, a reducer, a friction reducer, a clay stabilizing agent, and any combination thereof.

In one or more instances, the aqueous fluid comprises the polymer slurry, a buffer solution (e.g., an acetic acid/acetate buffer solution, such as PABA-152L (Precision Additives, Texas)), and a crosslinker (e.g., a Zr crosslinker, such as TYZOR® 212, ChemPoint, Washington).

In one or more aspects, to prepare the reduced-polymer-loading, high-temperature fracturing fluid, the polymer slurry is mixed with a tap water acetic acid/acetate buffer solution, crosslinker, gel-stabilizer, clay stabilizer, friction reducer polymer in proper amount.

In one or more aspects, to the prepared reduced-polymer-loading, high-temperature fracturing fluid, at least one of the additives is added into the polymer slurry in proper amount, which will advance the transportation and storage of the reduced-polymer-loading, high-temperature fracturing fluid chemicals as a single package.

Systems and Methods for Hydraulic Fracturing Using the Fracturing Fluid of the Present Disclosure Methods included in the present disclosure include preparing a polymer slurry as described hereinabove, the polymer slurry comprising a polymer powder and at least one additive, including one, more, or all of at least a buffering agent, a crosslinker, and a gel stabilizer, contacting the polymer slurry and hydrating it with an aqueous carrier fluid to produce the reduced-polymer-loading, high-temperature fracturing fluid of the present disclosure. The reduced-polymer-loading, high-temperature fracturing fluid is introduced into a subterranean formation at a rate and pressure to induce at least one fracture therein.

Proppant may be included in the aqueous carrier fluid and upon contacting the polymer slurry and the aqueous carrier fluid to produce the reduced-polymer-loading, high-temperature fracturing fluid of the present disclosure, it is introduced into a subterranean formation at a rate and pressure to induce the at least one fracture. The proppant is deposited into the fractures to form proppant packs and to hold the at least one fracture open once hydraulic pressure is removed. Once removed, the proppant packs create conductive pathways in the fractures through which produced fluids (e.g., hydrocarbons) flow.

In one or more aspects, the polymer slurry and the aqueous carrier fluid may be contacted prior to introduction into the subterranean formation; in other instances, the polymer slurry and the aqueous carrier fluid may be contacted on-the-fly (i.e., at the wellsite as each fluid is being introduced into the subterranean formation).

Figure 1:
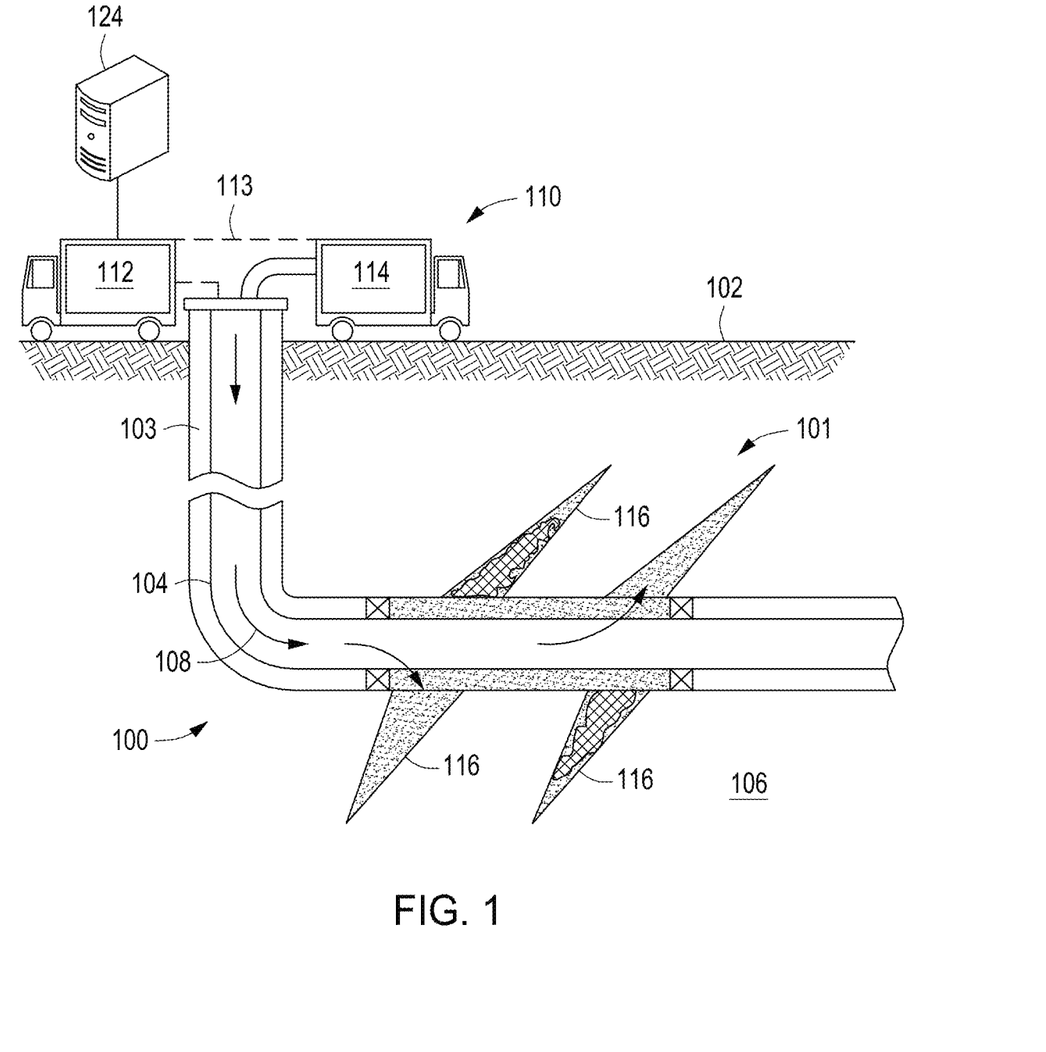
FIG. 1 depicts a system for delivery of a reduced-polymer-loading, high-temperature fracturing fluid of the present disclosure into a subterranean formation.

FIG. 1 depicts an example well system 100 for performing a hydraulic fracturing treatment (or operation) in a subterranean formation 101. Fracturing treatments can be used, for example, to form or propagate fractures in a rock layer by injecting pressurized fluid. The fracture treatment can include an acid treatment to enhance or otherwise influence production of petroleum, natural gas, coal seam gas, or other types of reservoir resources. The example well system 100 includes an injection system 110 that applies fracturing fluid 108 to a reservoir 106 in the subterranean zone 101. The subterranean zone 101 can include a formation, multiple formations, or portions of a formation, and may be conventional or unconventional formations. The injection system 110 includes control trucks 112, pump trucks 114, a wellbore 103, a working string 104, and other equipment. In the example shown in FIG. 1, the pump trucks 114, the control trucks 112, and other related equipment are above the surface 102, and the wellbore 103, the working string 104, and other equipment are beneath the surface 102. An injection system can be configured as shown in FIG. 1 or in a different manner and it can include additional or different features as appropriate, including multiple pump trucks 114 and/or multiple control trucks 112, without departing from the scope of the present disclosure. The injection system 110 can be deployed in any suitable environment, for example, via skid equipment, a marine vessel, sub-sea deployed equipment, or other types of equipment.

The wellbore 103 shown in FIG. 1 includes vertical and horizontal sections. Generally, a wellbore can include horizontal, vertical, slant, curved, and other types of wellbore geometries and orientations, and the fracturing treatment can generally be applied to any portion of a subterranean zone 101. The wellbore 103 can include a casing that is cemented or otherwise secured to the wellbore wall. The wellbore 103 can be uncased or include uncased sections. Perforations 116 can be formed in the casing to allow fracturing fluids and/or other materials to flow into the reservoir 106. Perforations 116 can be formed using shape charges, a perforating gun, and/or other tools.

The pump trucks 114 can include mobile vehicles, immobile installations, skids, hoses, tubes, fluid tanks or reservoirs, pumps, valves, and/or other suitable structures and equipment. The control trucks 112 can receive data from, or otherwise communicate with, a computing system 124 that monitors one or more aspects of the fracturing operation. The pump trucks 114 can communicate with the control trucks 112, for example, by a communication link 113. The pump trucks 114 are coupled to the working string 104 to communicate the fracturing fluid 108 into the wellbore 103. The working string 104 can include coiled tubing, sectioned pipe, and/or other structures that communicate fluid through the wellbore 103. The working string 104 can include flow control devices, bypass valves, ports, and/or other tools or well devices that control the flow of fracturing fluid from the interior of the working string 104 into the reservoir 106.

Example Embodiments

Embodiments disclosed herein include:

Embodiment A: A hydratable polymer slurry comprising: a hydrocarbon-based solvent comprising: a hydratable polymer powder and at least one of a surfactant, a hydrocarbon-soluble polymer, or an organophilic clay, wherein the hydratable polymer slurry is prepared at a temperature greater than 22° C. by mixing.

Embodiment B: A reduced-polymer-loading, high-temperature fracturing fluid comprising: a hydratable polymer slurry comprising: a hydrocarbon-based solvent comprising: a hydratable polymer powder and at least one of a polar surfactant, a hydrocarbon-soluble polymer, or an organophilic clay, wherein the hydratable polymer slurry is prepared at a temperature greater than 22° C. by mixing; and an aqueous carrier fluid.

Embodiment C: A method of treating a subterranean formation comprising: preparing a hydratable polymer slurry, the hydratable polymer slurry comprising: a hydrocarbon-based solvent comprising: a hydratable polymer powder and at least one of a polar surfactant, a hydrocarbon-soluble polymer, or an organophilic clay, wherein the hydratable polymer slurry is prepared at a temperature greater than 22° C. by mixing; hydrating the hydratable polymer slurry with an aqueous carrier fluid to form a reduced-polymer-loading, high-temperature fracturing fluid; introducing the reduced-polymer-loading, high-temperature fracturing fluid into a subterranean formation at a rate and pressure to induce at least one fracture therein.

Embodiment A has one or more of the following additional elements in any combination:

Element 1: prepared at a temperature in the range of 22° C. to 60° C.

Element 2: wherein the hydrocarbon-based solvent is selected from the group consisting of hydrotreated petroleum distillate, hydrotreated naphthalenic heavy oil, mineral oil, diesel oil, castor oil, palm oil and derivatives thereof, vegetable oil, animal oils, polyols-based hydrocarbons, biodegradable fatty acids, acetals, olefins, and any combination thereof.

Element 3: wherein the hydrocarbon-based solvent is present in a concentration of 20 wt. % to 80 wt. % of the polymer slurry.

Element 4: wherein the polymer powder is selected from the group consisting of polyacrylamide, partially hydrolyzed polyacrylamide, a copolymer of acrylamide and 2-acrylamido-2-methylpropanesulfonic acid (AMPSA), a terpolymer of acrylamide, acrylic acid and 2-acrylamido-2-methylpropanesulfonic acid (AMPSA), or other acrylamide-based polymers with hydrophobic monomers, and any combination thereof.

Element 5: wherein the hydratable polymer powder is a polyacrylamide.

Element 6: wherein the hydratable polymer powder is present in a concentration in the range of 5 wt. % to 60 wt. %.

Element 7: wherein the hydrocarbon-soluble polymer is selected from the group consisting of a linear diblock copolymer based on styrene and ethylene/propylene, sulfonated polystyrene, sulfonated t-butyl styrene, sulfonated polyethylene, sulfonated polypropylene, sulfonated styrene/acrylonitrile copolymers, sulfonates styrene/methyl methacrylate copolymers, sulfonated block copolymers of styrene/ethylene oxide, acrylic acid copolymers with styrene, sulfonated polyisobutylene, sulfonated ethylene-propylene terpolymers, sulfonated polyisoprene, and sulfonated elastomers and their copolymers such as isoprene styrene sulfonate copolymer polymer, styrene, t-butyl styrene, acrylonitrile, isoprene, butadiene, acrylates, methacrylates, vinyl acetate, and any combination thereof.

Element 8: wherein the hydrocarbon-soluble polymer is present in a concentration in the range of 0.4 wt. % to 20 wt. % of the polymer slurry.

Element 9: wherein the organic clay is selected from the group consisting of cetylammonium, cetyltrimethylammonium Bromide, Hexadecyltrimethylammonium bromide, Octadecylammonium bromide, Tetradecyl trimethylammonium bromide, Hexadecyl trimethylammonium bromide, 1-Hexadecylamin, Octadecylamine, Trimethylammonium bromide, Octadecylammonium bromide, (Butoxymethyl) dodecyl dimethylammonium chloride, Dodecyl dimethyl (hexyloxymethyl)-ammonium Chloride, Dodecyl dimethyl (octyloxymethyl)-ammonium chloride, (Decyloxymethyl) dodecyl dimethylammonium chloride, Dodecyl dimethyl-(dodecyloxymethyl) ammonium Chloride, (Benzyloxymethyl) dodecyl dimethylammonium chloride, Octadecylammonium chloride, Bis(2-hydroxyethyl)laurylammonium chloride, Diethyl[2(methacryloyloxyl)ethyl]-ammonium chloride, Bis(hydroxyethyl)lauryl-(vinylbenzyl)ammonium chloride, Tetrabutyl phosphonium bromide, Tributyl hexadecylphosphonium bromide, Tributyl tetradecylphosphonium chloride, Tetraphenyl phosphonium bromide, Methyl triphenylphosphonium bromide, Ethyl triphenylphosphonium bromide, Propyl triphenylphosphonium bromide, Trimethyloctadecylammonium, Dimethyldioctadecylammonium, Trimethyloctadecylammonium, Dimethyldioctadecylammonium, Dimethyldi(HT)ammonium, and any combination thereof.

Element 10: wherein the organophilic clay is present in a concentration of 0.1 wt. % to 5 wt. %.

By way of non-limiting example, exemplary combinations applicable to Embodiment A include: any one, more, or all of Elements 1-10 in any combination.

Embodiments B and C have one or more of the following additional elements in any combination, in addition to Elements 1-10:

Element 11: wherein the aqueous carrier fluid is selected from the group consisting of freshwater, acidified water, salt water, seawater, brine, an aqueous salt solution, purified wastewater, and any combination thereof.

Element 12: wherein the reduced-polymer-loading, high-temperature fracturing fluid further comprises proppant particulates.

Element 13: wherein the reduced-polymer-loading, high-temperature fracturing fluid further comprises proppant particulates, and wherein the proppant particulates are selected from the group consisting of sand, bauxite, gravel, ceramic material, glass material, polymeric material, polytetrafluoroethylene material, nut shell pieces, a cured resinous particulate comprising nut shell pieces, seed shell pieces, a cured resinous particulate comprising seed shell pieces, fruit pit pieces, a cured resinous particulate comprising fruit pit pieces, wood, composite particulates, and any combination thereof. Suitable composite particulates may comprise a binder and a filler material, wherein suitable filler materials may include, but are not limited to, silica, alumina, fumed carbon, carbon black, graphite, mica, titanium dioxide, barite, meta-silicate, calcium silicate, kaolin, talc, zirconia, boron, fly ash, hollow glass microspheres, solid glass, and the like, and any combination thereof.

Element 14: wherein the reduced-polymer-loading, high-temperature fracturing fluid further comprises proppant particulates, and wherein the proppant particulates are present in a concentration of 0.25 pounds per gallon to 30 pounds per gallon.

By way of non-limiting example, exemplary combinations applicable to Embodiments B through C include: any one, more, or all of Elements 1-14 in any combination.

Embodiment C has one or more of the following additional elements in any combination, in addition to Elements 1-14:

Element 15: wherein the hydratable polymer slurry is hydrated with the aqueous carrier fluid on-the-fly.

Element 16: wherein the reduced-polymer-loading, high-temperature fracturing fluid further comprises proppant particulates that are introduced into the at least one fracture.

Element 17: wherein the aqueous carrier fluid comprises proppant particulates prior to the hydrating of the polymer slurry with the aqueous carrier fluid to form the reduced-polymer-loading, high-temperature fracturing fluid, and introducing the reduced-polymer-loading, high-temperature fracturing fluid into the subterranean formation to induce the at least one fracture therein comprises introducing the proppant particulates into the at least one fracture.

By way of non-limiting example, exemplary combinations applicable to Embodiment C include: any one, more, or all of Elements 1-17 in any combination.

To facilitate a better understanding of the embodiments described herein, the following examples of various representative embodiments are given. In no way should the following examples be read to limit, or to define, the scope of the present disclosure.

EXAMPLES

Examples 1 to 5

In the Examples below, various polymer slurry preparations were prepared and tested for stability at high temperature. Each of the polymer slurries in Examples 1-5 were prepared according to the following methodology:

To a waring blender containing hydrocarbon-based solvent, dry polymer powder was added while mixing at a temperature between 22° C. and 60° C. The polymer slurry was mixed to dissolve the polymer. After full dissolution of the polymer powder in the hydrocarbon-based solvent, a polar activator, a hydratable dry polymer, and organophilic clay was added into the suspension and the mixture was stirred for an additional 1 hour at a temperature between 22° C. and 60° C.

The stability of the polymer slurry was measured as follows: 100 ml of the polymer slurry was added into a graduated cylinder. The cylinder was kept in an oven heated to 55° C. and the polymer slurry was periodically photographed for 20 days to observe the separation of the oil phase and settlement/precipitation.

The chemicals used for preparing the polymer slurry and stability testing are listed in Table 1 below. In some instances, methanol (MeOH) was added to the polymer slurry to activate the organophilic clay.

TABLE 1

| Type | Chemical | Tradename |
|---|---|---|
| Hydrocarbon-based solvent | Mixture of isoparaffins and naphthenics | LPA ® 210 (Ecolink, India) |
| Polymer Powder | Polyacrylamide | DP/JBA 5088 (SNF, Georgia) |
| Polar Activator (surfactant) | C9-C11 alcohols reacted with ethylene oxide to produce ethoxylates | NEODOL N91-2-5 (Shell, Texas) |
| Hydrocarbon-soluble polymer | Linear diblock copolymer based on styrene and ethylene/propylene | KRATON ™ G1701E (Kraton Corporation, TX) |
| Organophilic Clay | Organic derivative of bentonite clay | OCS 100 (Finoric, TX) |

Example 1

In this Example, the polymer slurry was prepared according to Table 2:

TABLE 2

| Chemical | Concentration (wt. %) |
|---|---|
| LPA ® 210 | 52.6 |
| DP/JBA 5088 | 44.6 |
| NEODOL N91-2-5 | 0.5 |
| KRATON ™ G1701E | 1.8 |
| OSC 100 | 0 |
| MeOH(95%) + H₂O(5%) | 0.5 |

Figure 2:
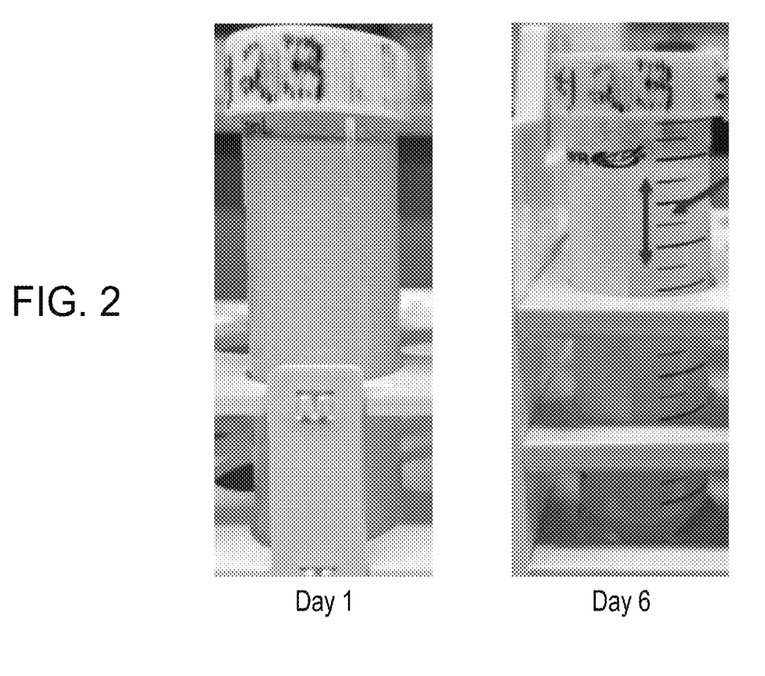
FIGS. 2 and 3 show 50° C. stability results for polymer slurries prepared at room temperature according to the present disclosure.

The polymer slurry was prepared at room temperature and the stability was tracked at 50° C. and photographed after 6 days. As shown in FIG. 2, the polymer slurry exhibited phase separation as shown by the arrows.

Example 2

In this Example, the polymer slurry was prepared according to Table 3:

TABLE 3

| Chemical | Concentration (wt. %) |
|---|---|
| LPA ® 210 | 50.7 |
| DP/JBA 5088 | 44 |
| NEODOL N91-2-5 | 0.25 |
| KRATON ™ G1701E | 2.5 |
| OSC 100 | 2.3 |
| MeOH(95%) + H₂O(5%) | 0 |

Figure 3:
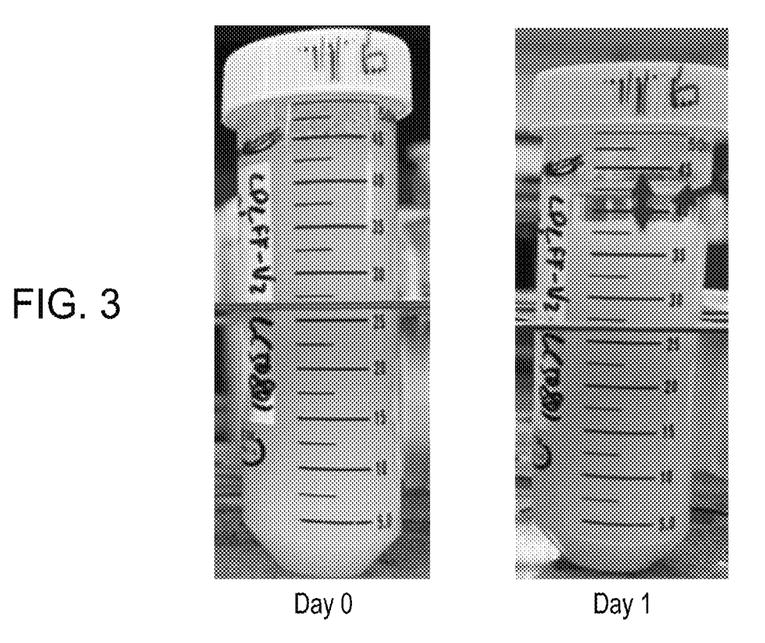

The polymer slurry was prepared at room temperature and the stability was tracked at 50° C. and photographed after 1 day. As shown in FIG. 3, the polymer slurry exhibited phase separation as shown by the arrows.

Example 3

In this Example, the polymer slurry was prepared according to Table 4:

TABLE 4

| Chemical | Concentration (wt. %) |
|---|---|
| LPA ® 210 | 49.36 |
| DP/JBA 5088 | 47.8 |
| NEODOL N91-2-5 | 00.54 |
| KRATON ™ G1701E | 1.6 |
| OSC 100 | 0.2 |
| MeOH(95%) + H₂O(5%) | 0.5 |

Figure 4:
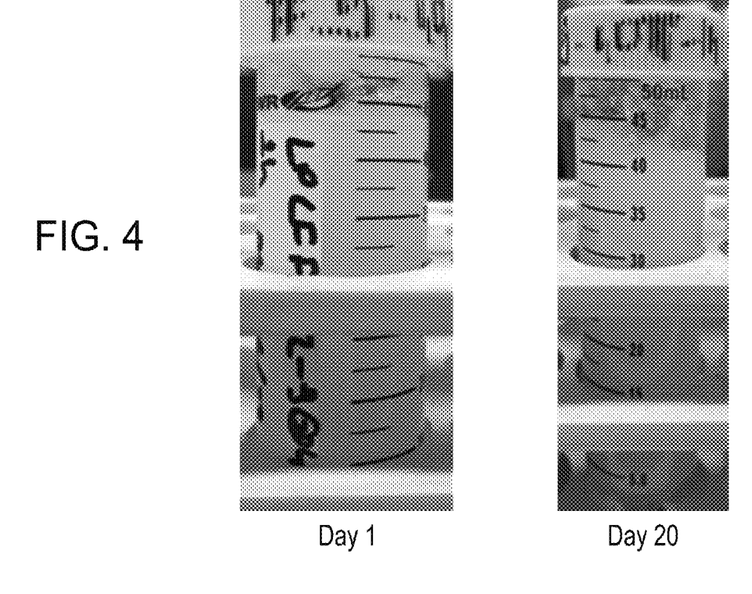
FIG. 4 shows 50° C. stability results for polymer slurries prepared at 40° C. according to the present disclosure.

The polymer slurry was prepared at 40° C. and the stability was tracked at 50° C. and photographed after 20 days. As shown in FIG. 4, unexpectedly, preparation of the polymer slurry at the higher temperature of 40° C. (as opposed to room temperature in Examples 1 and 2), the polymer slurry did not exhibit phase separation, but instead was stable for 20 days. Without being bound by theory, it is believed that this is due to synergistic chemical interactions between the hydrocarbon-based solvent, polymer additives, and clay additives.

Example 4

In this Example, the polymer slurry was prepared according to Table 5:

TABLE 5

| Chemical | Concentration (wt. %) |
|---|---|
| LPA ® 210 | 49.36 |
| DP/JBA 5088 | 47.8 |
| NEODOL N91-2-5 | 00.54 |
| KRATON ™ G1701E | 1.6 |
| OSC 100 | 0.2 |
| MeOH(95%) + H$_2$O(5%) | 0.5 |

Figure 5:
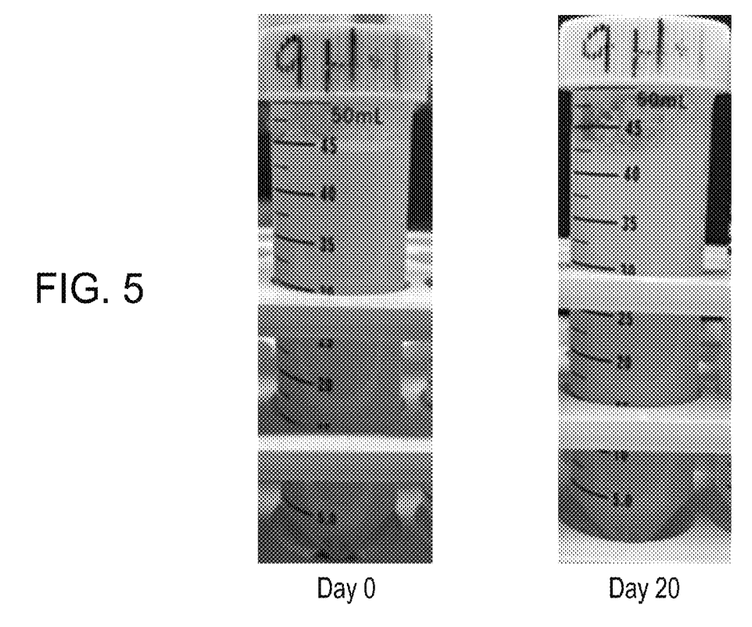
FIGS. 5 and 6 show 50° C. stability results for polymer slurries prepared at 50° C. according to the present disclosure.

The polymer slurry was prepared at 50° C. and the stability was tracked at 50° C. and photographed after 20 days. As shown in FIG. 5, unexpectedly, preparation of the polymer slurry at the higher temperature of 50° C. (as opposed to room temperature in Examples 1 and 2), the polymer slurry did not exhibit phase separation, but instead was stable for 20 days. Without being bound by theory, it is believed that this is due to synergistic chemical interactions between the hydrocarbon-based solvent, polymer additives, and clay additives.

Example 5

In this Example, the polymer slurry was prepared according to Table 6:

TABLE 6

| Chemical | Concentration (wt. %) |
|---|---|
| LPA ® 210 | 52.6 |
| DP/JBA 5088 | 44.6 |
| NEODOL N91-2-5 | 0.5 |
| KRATON ™ G1701E | 1.8 |
| OSC 100 | 0 |
| MeOH(95%) + H$_2$O(5%) | 0.5 |

Figure 6:
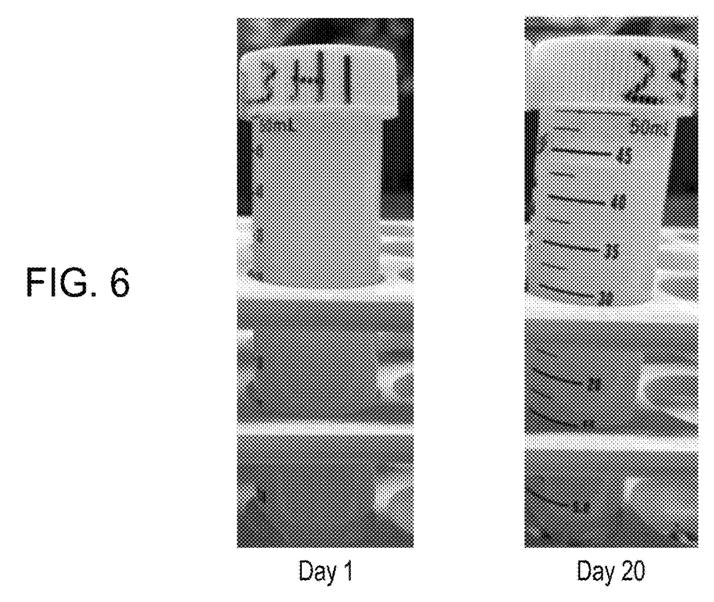

The polymer slurry was prepared at 50° C. and the stability was tracked at 50° C. and photographed after 20 days. As shown in FIG. 6, unexpectedly, preparation of the polymer slurry at the higher temperature of 50° C. (as opposed to room temperature in Example 1 having the same composition), the polymer slurry did not exhibit phase separation, but instead was stable for 20 days. Without being bound by theory, it is believed that this is due to synergistic chemical interactions between the hydrocarbon-based solvent, polymer additives, and clay additives.

Example 6

In this Example, the rheology of a reduced-polymer-loading, high-temperature fracturing fluid at high temperature and high pressure is shown. The reduced-polymer-loading, high-temperature fracturing fluid was prepared as follows:
(1) A polymer slurry comprising a hydrocarbon-based solvent, 25 pounds per one-thousand-gallon (pptg) of DP/JBA 5088 polymer powder with tap water; and
(2) An aqueous carrier fluid including 4 gallons-per-one-thousand-gallons (gpt) acetic acid/acetate buffer solution (PABA-152L, Precision Additives) to stabilize the pH at crosslinking range; 2 gpt gel stabilizer (CELB 225-010-2, ChemEOR); and 0.5 gpt zirconium crosslinker (TYZOR® 212, ChemPoint, with 16.75 wt % ZrO$_2$ and 12.4 wt % Zr). Note that, while not used, a clay stabilizer could be used in this Example.

Figure 7:
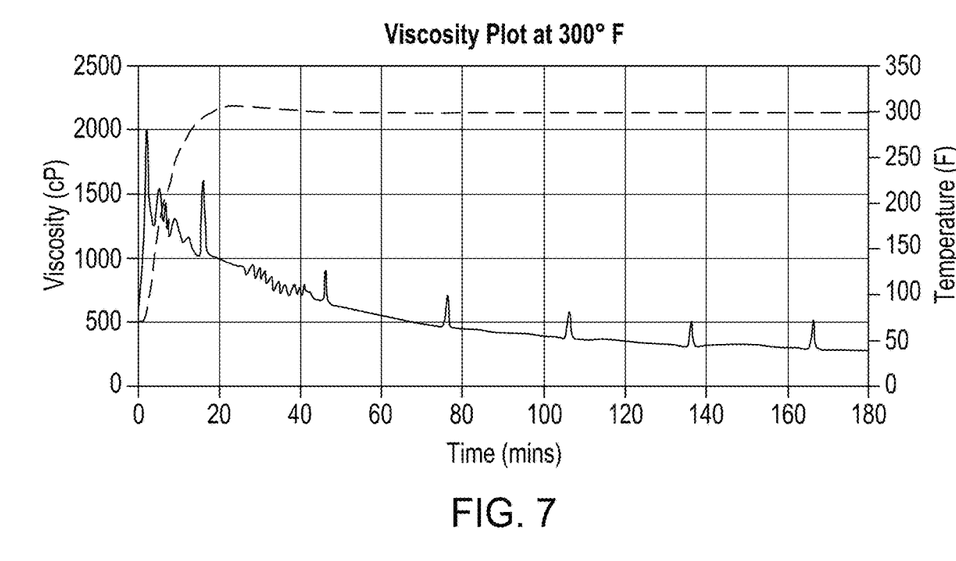
FIG. 7 is a rheology chart showing the viscosity effect on the reduced-polymer-loading, high-temperature fracturing fluid of the present disclosure.

Compositions (1) and (2) were mixed and the resulting rheology of the crosslinked reduced-polymer-loading, high-temperature fracturing fluid was measured at a shear rate of 100 s$^{-1}$ at 300° F. The results are shown in FIG. 7. As shown, the reduced-polymer-loading, high-temperature fracturing fluid maintained its viscosity greater than 270 cP at a shear rate of 100 s$^{-1}$ for three (3) hours.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains." "containing." "includes," "including," "comprises." and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized that these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and are not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A method of treating a subterranean formation, the method comprising:
preparing a polymer slurry by mixing at a temperature from 40° C. to 60° C.;
hydrating the polymer slurry with an aqueous carrier fluid to form a reduced-polymer-loading fracturing fluid, the polymer slurry comprising:
a hydrocarbon-based solvent, a hydratable polymer powder comprising polyacrylamide, partially hydrolyzed polyacrylamide, or both,
a polar surfactant comprising C9-C11 alcohols reacted with ethylene oxide to produce ethoxylates,
a hydrocarbon-soluble polymer comprising a linear diblock copolymer based on styrene and ethylene/propylene, and
an organophilic clay comprising clay treated with an amine; and
introducing the reduced-polymer-loading fracturing fluid into a subterranean formation at a rate and pressure to induce at least one fracture therein.

2. The method of claim 1, wherein the polymer slurry is hydrated with the aqueous carrier fluid on-the-fly.

3. The method of claim 1, wherein the reduced-polymer-loading fracturing fluid further comprises proppant particulates that are introduced into the at least one fracture.

4. The method of claim 3, wherein the proppant particulates are present in the reduced-polymer-loading fracturing fluid in an amount of about 0.25 pounds per gallon (ppg) to about 30 ppg by volume of the aqueous carrier fluid.

5. The method of claim 3, wherein the organophilic clay further comprises a clay treated with cetyltrimethylammonium bromide.

6. The method of claim 1, wherein the aqueous carrier fluid comprises proppant particulates prior to the hydrating of the polymer slurry with the aqueous carrier fluid to form the reduced-polymer-loading fracturing fluid, and wherein introducing the reduced-polymer-loading fracturing fluid into the subterranean formation to induce the at least one fracture therein comprises introducing the proppant particulates into the at least one fracture.

7. The method of claim 1, wherein the hydrocarbon-based solvent is selected from the group consisting of hydrotreated petroleum distillate, hydrotreated naphthalenic heavy oil, mineral oil, diesel oil, castor oil, palm oil and derivatives thereof, vegetable oil, animal oil, polyol-based hydrocarbon, biodegradable fatty acids, an acetal, and an olefin.

8. The method of claim 1, wherein the hydrocarbon-based solvent is present at a concentration of about 20 wt. % to about 80 wt. % of the polymer slurry.

9. The method of claim 1, wherein the hydratable polymer powder further comprises a polymer is selected from the group consisting of a copolymer of acrylamide and 2-acrylamido-2-methylpropanesulfonic acid (AMPSA), a terpolymer of acrylamide, acrylic acid and 2-acrylamido-2-methylpropanesulfonic acid (AMPSA), and an acrylamide-based polymer with hydrophobic monomers.

10. The method of claim 1, wherein the hydratable polymer powder is present at a concentration of about 5 wt. % to about 60 wt. % of the polymer slurry.

11. The method of claim 1, wherein the hydrocarbon-soluble polymer further comprises a polymer selected from the group consisting of a linear diblock copolymer based on styrene and ethylene/propylene, sulfonated polystyrene, sulfonated t-butyl styrene, sulfonated polyethylene, sulfonated polypropylene, sulfonated styrene/acrylonitrile copolymer, sulfonated styrene/methyl methacrylate copolymer, sulfonated block copolymers of styrene/ethylene oxide, acrylic acid copolymer with styrene, sulfonated polyisobutylene, sulfonated ethylene-propylene terpolymer, sulfonated polyisoprene, and sulfonated elastomer and copolymer with isoprene styrene sulfonate copolymer polymer, styrene, t-butyl styrene, acrylonitrile, isoprene, butadiene, acrylates, methacrylates, and vinyl acetate.

12. The method of claim 1, wherein the hydrocarbon-soluble polymer is present at a concentration of about 0.4 wt. % to about 20 wt. % of the polymer slurry.

13. The method of claim 1, wherein the organophilic clay comprises a clay treated with an amine selected from the group consisting of cetylammonium, cetyltrimethylammonium bromide, hexadecyltrimethylammonium bromide, octadecylammonium bromide, tetradecyl trimethylammonium bromide, hexadecyl trimethylammonium bromide, 1-hexadecylamin, octadecylamine, trimethylammonium bromide, octadecylammonium bromide, (butoxymethyl) dodecyl dimethylammonium chloride, dodecyl dimethyl (hexyloxymethyl)-ammonium chloride, dodecyl dimethyl (octyloxymethyl)-ammonium chloride, (decyloxymethyl) dodecyl dimethylammonium chloride, dodecyl dimethyl-(dodecyloxymethyl) ammonium chloride, (benzyloxymethyl) dodecyl dimethylammonium chloride, octadecylammonium chloride, bis(2-hydroxyethyl)laurylammonium chloride, diethyl[2(methacryloyloxyl)ethyl]-ammonium chloride, bis(2-hydroxyethyl)lauryl-(vinylbenzyl)ammonium chloride, tetrabutyl phosphonium bromide, tributyl hexadecylphosphonium bromide, tributyl tetradecylphosphonium chloride, tetraphenyl phosphonium bromide, methyl triphenylphosphonium bromide, ethyl triphenylphosphonium bromide, propyl triphenylphosphonium bromide, trimethyloctadecylammonium, dimethyldioctadecylammonium, trimethyloctadecylammonium, dimethyldioctadecylammonium, and dimethyldi(HT)ammonium, and any combination thereof.

14. The method of claim 1, wherein the organophilic clay is present at a concentration of about 0.1 wt. % to about 5 wt. % of the polymer slurry.

* * * * *